United States Patent
Stamm

(10) Patent No.: US 11,092,034 B2
(45) Date of Patent: *Aug. 17, 2021

(54) ALLOY, PROTECTIVE LAYER AND COMPONENT

(75) Inventor: Werner Stamm, Mülheim an der Ruhr (DE)

(73) Assignee: SIEMENS ENERGY GLOBAL GMBH & CO, KG

( * ) Notice: Subject to any disclaimer, the term of this patent is extended or adjusted under 35 U.S.C. 154(b) by 0 days.

This patent is subject to a terminal disclaimer.

(21) Appl. No.: 14/236,785

(22) PCT Filed: Jun. 22, 2012

(86) PCT No.: PCT/EP2012/062062
§ 371 (c)(1),
(2), (4) Date: Apr. 17, 2014

(87) PCT Pub. No.: WO2013/020748
PCT Pub. Date: Feb. 14, 2013

(65) Prior Publication Data
US 2014/0220379 A1    Aug. 7, 2014

(30) Foreign Application Priority Data
Aug. 9, 2011 (EP) .................... 11176987

(51) Int. Cl.
*F01D 25/00* (2006.01)
*C22C 19/07* (2006.01)
(Continued)

(52) U.S. Cl.
CPC ............ *F01D 25/007* (2013.01); *B32B 15/01* (2013.01); *B32B 15/04* (2013.01); *B32B 15/043* (2013.01);
(Continued)

(58) Field of Classification Search
CPC ....... B32B 15/04; B32B 15/043; B32B 15/20; B32B 2311/22; B32B 2311/24;
(Continued)

(56) References Cited

U.S. PATENT DOCUMENTS 4,005,989 A    2/1977    Preston
4,034,142 A    7/1977    Hecht
(Continued)

FOREIGN PATENT DOCUMENTS

CA    2 414 019 A1    6/2003
CN    1242806 A    1/2000
(Continued)

OTHER PUBLICATIONS

Machine Translation, Stamm, EP 1790743, May 2007.*
(Continued)

*Primary Examiner* — Michael E. La Villa
(74) *Attorney, Agent, or Firm* — Ostrolenk Faber LLP

(57) ABSTRACT

Known protective layers having a high Cr content and additionally a silicon form brittle phases which additionally become brittle under the influence of carbon during use. The protective layer hereof has a composition 22% to 24% cobalt (Co), 10.5% to 11.5% aluminum (Al), 0.2% to 0.4% yttrium (Y) and/or at least one equivalent metal from the group comprising scandium and the rare earth elements, 14% to 16% chrome (Cr), optionally 0.3% to 0.9% tantalum, the remainder nickel (Ni).

8 Claims, 4 Drawing Sheets

(51) Int. Cl.
| | |
|---|---|
| C22C 30/00 | (2006.01) |
| C22C 19/05 | (2006.01) |
| B32B 15/01 | (2006.01) |
| C23C 28/00 | (2006.01) |
| C23C 30/00 | (2006.01) |
| F01D 5/28 | (2006.01) |
| C23C 4/073 | (2016.01) |
| C23C 28/02 | (2006.01) |
| B32B 15/20 | (2006.01) |
| B32B 15/04 | (2006.01) |
| C22C 19/00 | (2006.01) |
| C22C 19/03 | (2006.01) |
| C23C 4/134 | (2016.01) |

(52) U.S. Cl.
CPC .............. *B32B 15/20* (2013.01); *C22C 19/00* (2013.01); *C22C 19/007* (2013.01); *C22C 19/03* (2013.01); *C22C 19/05* (2013.01); *C22C 19/055* (2013.01); *C22C 19/056* (2013.01); *C22C 19/057* (2013.01); *C22C 19/058* (2013.01); *C22C 19/07* (2013.01); *C22C 30/00* (2013.01); *C23C 4/073* (2016.01); *C23C 4/134* (2016.01); *C23C 28/02* (2013.01); *C23C 28/022* (2013.01); *C23C 28/321* (2013.01); *C23C 28/3215* (2013.01); *C23C 28/345* (2013.01); *C23C 28/3455* (2013.01); *C23C 30/00* (2013.01); *C23C 30/005* (2013.01); *F01D 5/28* (2013.01); *F01D 5/288* (2013.01); *B32B 2311/22* (2013.01); *B32B 2311/24* (2013.01); *B32B 2603/00* (2013.01); *F05D 2230/90* (2013.01); *F05D 2300/13* (2013.01); *F05D 2300/15* (2013.01); *F05D 2300/518* (2013.01); *Y02T 50/60* (2013.01); *Y10T 428/12597* (2015.01); *Y10T 428/12604* (2015.01); *Y10T 428/12611* (2015.01); *Y10T 428/12618* (2015.01); *Y10T 428/12861* (2015.01); *Y10T 428/12931* (2015.01); *Y10T 428/12944* (2015.01)

(58) Field of Classification Search
CPC ..... B32B 2603/00; B32B 15/01; C23C 4/085; C23C 28/022; C23C 28/3215; C23C 30/00; C23C 30/005; C23C 28/3455; C23C 28/345; C23C 28/02; C23C 28/321; C23C 4/073; C23C 4/134; F01D 5/28; F01D 5/288; F01D 25/007; C22C 19/00; C22C 19/007; C22C 19/03; C22C 19/05; C22C 19/056; C22C 19/07; C22C 19/058; C22C 19/055; C22C 19/057; C22C 30/00; Y02T 50/60; Y10T 428/12931; Y10T 428/12611; Y10T 428/12618; Y10T 428/12944; Y10T 428/12604; Y10T 428/12597; Y10T 428/12861; F05D 2300/1513; F05D 2300/518; F05D 2230/90
USPC ....... 428/621, 668, 627, 632, 633, 680, 679, 428/678, 937
See application file for complete search history.

(56) References Cited

U.S. PATENT DOCUMENTS

| | | | | |
|---|---|---|---|---|
| 4,326,011 | A | * | 4/1982 | Goebel et al. ................ 428/641 |
| 4,451,299 | A | | 5/1984 | Smeggil et al. |
| 4,909,984 | A | * | 3/1990 | Singheiser .............. C23C 30/00 420/443 |
| 5,499,905 | A | | 3/1996 | Schmitz et al. |
| 5,993,980 | A | * | 11/1999 | Schmitz et al. ............. 428/633 |
| 6,024,792 | A | | 2/2000 | Kurz et al. ........................ 117/9 |
| 6,231,692 | B1 | | 5/2001 | Vogt et al. .................... 148/428 |
| 6,280,857 | B1 | * | 8/2001 | Sommer et al. ............. 428/633 |
| 6,610,419 | B1 | | 8/2003 | Stamm |
| 6,924,046 | B2 | | 8/2005 | Stamm .......................... 428/678 |
| 8,025,984 | B2 | | 9/2011 | Stamm .......................... 428/678 |
| 2004/0011439 | A1 | | 1/2004 | Corrigan et al. ............. 148/555 |
| 2004/0079648 | A1 | * | 4/2004 | Khan et al. .................... 205/271 |
| 2004/0180233 | A1 | * | 9/2004 | Stamm .......................... 428/680 |
| 2005/0238907 | A1 | | 10/2005 | Quadakkers et al. |
| 2013/0136948 | A1 | | 5/2013 | Schmitz et al. |
| 2013/0288072 | A1 | | 10/2013 | Schmitz et al. |

FOREIGN PATENT DOCUMENTS

| | | |
|---|---|---|
| CN | 1198964 C | 4/2005 |
| CN | 1665959 A | 9/2005 |
| CN | 102933734 A | 2/2013 |
| CN | 103282197 A | 9/2013 |
| EP | 0397731 B1 | 11/1990 |
| EP | 0 241 807 B1 * | 7/1991 |
| EP | 0 892 090 A1 | 1/1999 |
| EP | 0 948 667 B1 | 10/1999 |
| EP | 1 306 454 A1 | 5/2003 |
| EP | 1 319 729 A1 | 6/2003 |
| EP | 1790743 * | 5/2007 |
| EP | 1 837 485 A1 | 9/2007 |
| EP | 2 216 421 A1 | 8/2010 |
| JP | 04-032546 * | 2/1992 |
| JP | 2002513081 A | 5/2002 |
| JP | 3939362 B2 | 7/2007 |
| KR | 10-0354411 | 11/2002 |
| RU | 2334022 | 11/2007 |
| WO | WO 91/01433 A1 | 2/1991 |
| WO | WO 99/67435 | 12/1999 |
| WO | WO 00/44949 | 8/2000 |

OTHER PUBLICATIONS

Translation, Hirota, JP 04-032546, Feb. 1992.*
International Search Report dated Nov. 22, 2012 issued in corresponding International patent application No. PCT/EP2012/062062.
Written Opinion dated Nov. 22, 2012 issued in corresponding International patent application No. PCT/EP2012/062062.
Office Action dated Jan. 9, 2015 and Search Report in corresponding Chinese Patent Application No. 201280039088.7 (with partial English language translation) (16 pages).
Russian Grant Decision dated Feb. 10, 2016 issued in Russian Application No. 2014108597/02(013658).
Office Action dated Oct. 21, 2015 in corresponding Chinese Patent Application No. 201280039088.7 (3 pages).
Office Action dated Nov. 4, 2015 in corresponding Korean Patent Application No. 10-2014-7003020 (with English language translation)(7 total pages).
Office Action dated Nov. 18, 2015 in corresponding Russian Application No. 2014108597 (7 total pages).
Kumanin V.I.; "Bedeutungswörterbuch der Metallurgie, grundlegende Begriffe"; Russkij Jazyk; pp. 320; 1989 (English translation).

* cited by examiner

FIG 2

| Material | Chemical composition in % | | | | | | | | | | | | |
|---|---|---|---|---|---|---|---|---|---|---|---|---|---|
| | C | Cr | Ni | Co | Mo | W | Ta | Nb | Al | Ti | B | Zr | Hf |
| Ni-based precision casting alloys | | | | | | | | | | | | | |
| GTD 222 | 0.10 | 22.5 | Remainder | 19.0 | | 2.0 | 1.0 | | 1.2 | 2.3 | 0.008 | | |
| IN 939 | 0.15 | 22.4 | Remainder | 19.0 | | 2.0 | 1.4 | 1.0 | 1.9 | 3.7 | 0.009 | 0.10 | |
| IN 6203 DS | 0.15 | 22.0 | Remainder | 19.0 | | 2.0 | 1.1 | 0.8 | 2.3 | 3.5 | 0.010 | 0.10 | 0.75 |
| Udimet 500 | 0.10 | 18.0 | Remainder | 18.5 | 4.0 | | | | 2.9 | 2.9 | 0.006 | 0.05 | |
| IN 738 LC | 0.10 | 16.0 | Remainder | 8.5 | 1.7 | 2.6 | 1.7 | 0.9 | 3.4 | 3.4 | 0.010 | 0.10 | |
| SC 16 | <.01 | 16.0 | Remainder | | 3.0 | | 3.5 | | 3.5 | 3.5 | <0.005 | <0.008 | |
| Rene 80 | 0.17 | 14.0 | Remainder | 9.5 | 4.0 | 4.0 | | | 3.0 | 5.0 | 0.015 | 0.03 | |
| GTD 111 | 0.10 | 14.0 | Remainder | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Remainder | 9.0 | 1.9 | 4.1 | 4.1 | | 3.4 | 3.8 | 0.015 | 0.02 | |
| IN 792 DS | 0.08 | 12.5 | Remainder | 9.0 | 1.9 | 4.1 | 4.1 | | 3.4 | 3.8 | 0.015 | 0.02 | 1.00 |
| MAR M 002 | 0.15 | 9.0 | Remainder | 10.0 | | 10.0 | 2.5 | | 5.5 | 1.5 | 0.015 | 0.05 | 1.50 |
| MAR M 247 LC DS | 0.07 | 8.1 | Remainder | 9.2 | 0.5 | 9.5 | 3.2 | | 5.6 | 0.7 | 0.015 | 0.02 | 1.40 |
| CMSX 2 | <.006 | 8.0 | Remainder | 4.6 | 0.6 | 8.0 | 6.0 | | 5.6 | 1.0 | <.003 | <.0075 | |
| CMSX 3 | <.006 | 8.0 | Remainder | 4.6 | 0.6 | 8.0 | 6.0 | | 5.6 | 1.0 | <.003 | <.0075 | 0.10 |
| CMSX 4 | | 6.0 | Remainder | 10.0 | 0.6 | 6.0 | 6.0 | | 5.6 | 1.0 | | Re=3.0 | 0.10 |
| CMSX 6 | <.015 | 10.0 | Remainder | 5.0 | 3.0 | <.10 | 2.0 | <.10 | 4.9 | 4.8 | <.003 | <.0075 | 0.10 |
| PWA 1480 SX | <.006 | 10.0 | Remainder | 5.0 | | 4.0 | 12.0 | | 5.0 | 1.5 | <.0075 | <.0075 | |
| PWA 1483 SX | 0.07 | 12.2 | Remainder | 9.0 | 1.9 | 3.8 | 5.0 | | 3.6 | 4.2 | 0.0001 | 0.002 | |
| Co-based precision casting alloys | | | | | | | | | | | | | |
| FSX 414 | 0.25 | 29.0 | 10 | Remainder | | 7.5 | | | | | 0.010 | | |
| X 45 | 0.25 | 25.0 | 10 | Remainder | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR M-509 | 0.65 | 24.5 | 11 | Remainder | | 7.5 | 4 | | | 0.3 | 0.010 | 0.60 | |
| CM 247 | 0.07 | 8.3 | Remainder | 10.0 | 0.5 | 9.5 | 3.2 | | 5.5 | 0.7 | | | 1.5 |

ALLOY, PROTECTIVE LAYER AND COMPONENT

CROSS-REFERENCE TO RELATED APPLICATIONS

The present application is a 35 U.S.C. §§ 371 national phase conversion of PCT/EP2012/062,062, filed Jun. 22, 2012, which claims priority of European Patent Application No. 11176987.3, filed Aug. 9, 2011, the contents of which are incorporated by reference herein. The PCT International Application was published in the German language.

FIELD OF THE INVENTION

The invention relates to an alloy as claimed, to a protective layer for protecting a component against corrosion and/or oxidation, in particular at high temperatures, and to a component from the alloy.

TECHNICAL BACKGROUND

Large numbers of protective layers for metal components, which are intended to increase their corrosion resistance and/or oxidation resistance, are known in the prior art. Most of these protective layers are known by the generic name MCrAlY, where M stands for at least one of the elements from the group comprising iron, cobalt and nickel and other essential constituents are chromium, aluminum and yttrium.

Typical coatings of this type are known from U.S. Pat. Nos. 4,005,989 and 4,034,142.

The endeavor to increase the intake temperatures both in static gas turbines and in aircraft engines is of great importance in the specific field of gas turbines, since the intake temperatures are important determining quantities for the thermodynamic efficiencies achievable with gas turbines. Intake temperatures significantly higher than 1000° C. are possible when using specially developed alloys as base materials for components to be heavily loaded thermally, such as guide vanes and rotor blades, in particular by using single-crystal superalloys. To date, the prior art permits intake temperatures of 950° C. or more for static gas turbines and 1100° C. or more in gas turbines of aircraft engines.

Examples of the structure of a turbine blade with a single-crystal substrate, which in turn may be complexly constructed, are disclosed by WO 91/01433 A1.

While the physical loading capacity of the base materials so far developed for the components to be heavily loaded is substantially unproblematic in respect of possible further increases in the intake temperatures, it is necessary to resort to protective layers in order to achieve sufficient resistance against oxidation and corrosion. Besides sufficient chemical stability of a protective layer under the aggressions which are to be expected from exhaust gases at temperatures of the order of 1000° C., a protective layer must also have sufficiently good mechanical properties, not least in respect of the mechanical interaction between the protective layer and the base material. In particular, the protective layer must be ductile enough to be able to accommodate possible deformations of the base material and not crack, since points of attack would thereby be provided for oxidation and corrosion. The problem then typically arises that increasing the proportions of elements such as aluminum and chromium, which can improve the resistance of a protective layer against oxidation and corrosion, leads to a deterioration of the ductility of the protective layer so that mechanical failure is possible, in particular the formation of cracks, under a mechanical load conventionally occurring in a gas turbine.

SUMMARY OF THE INVENTION

It is therefore an object of the invention to provide an alloy and a protective layer, having good high-temperature resistance to corrosion and oxidation, having good long term stability and which is furthermore adapted particularly well to a mechanical load which is to be expected particularly in a gas turbine at a high temperature.

The object is achieved by an alloy as disclosed and a protective layer as disclosed.

It is another object of the invention to provide a component which has increased protection against corrosion and oxidation.

The object is likewise achieved by a component as claimed, in particular a component of a gas turbine or steam turbine, which comprises a protective layer of the type described above for protection against corrosion and oxidation at high temperatures.

Further advantageous measures may advantageously be combined with one another in any desired way.

The invention will be explained in more detail below.

The figures and the description merely represent exemplary embodiments of the invention.

BRIEF DESCRIPTION OF THE DRAWINGS

FIG. 2 shows compositions of superalloys.

DESCRIPTION OF EMBODIMENTS

Figure 1:
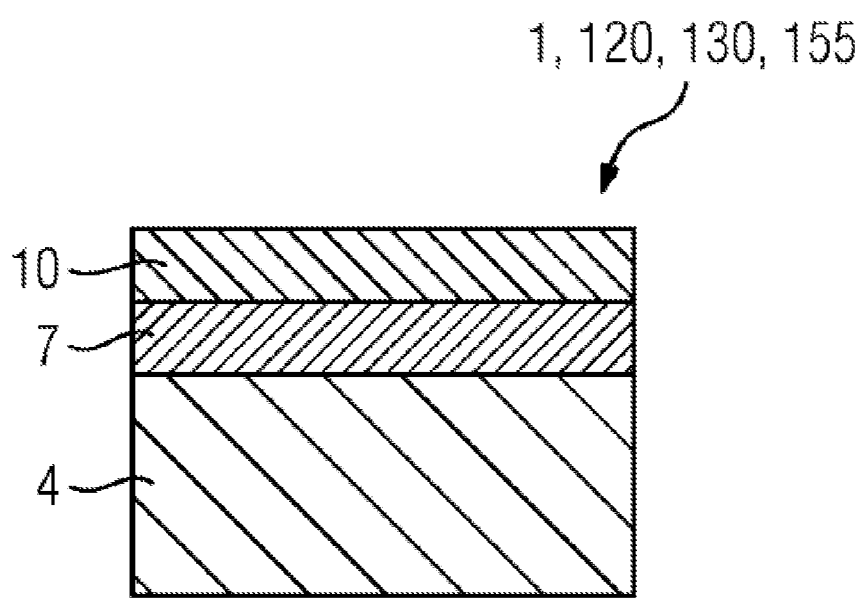
FIG. 1 shows a layer system with a protective layer.

According to the invention, a protective layer 7 (FIG. 1) for protecting a component against corrosion and oxidation at a high temperature essentially consists of comprises the following elements (proportions indicated in wt %):
nickel,
Co: 22%-24%,
Cr: 14%-16%,
Al: 10.5%-11.5%,
0.2%-0.4% rare earth element (yttrium, . . . ) and/or scandium (Sc):
optionally
Ta: 0.3%-0.9%.

The list of the alloying elements Ni, Co, Cr, Al, Y, Ta is preferably not conclusive.

Nickel preferably forms the matrix.

The list of Ni, Co, Cr, Al, Y, Ta is preferably conclusive.

The contents of the alloying elements Co, Cr, Al, Y have the following advantages:

Moderately high Co content:
Extension of the beta/gamma field, avoidance of brittle phases such as, for example, the alpha phases.

Moderate Cr content:
Sufficiently high for increasing the activity of Al for the $Al_2O_3$ formation;
low enough to avoid brittle phases (alpha chromium or sigma phase).

Moderately high Al content:
Sufficiently high for Al activity for the formation of a stable $Al_2O_3$ layer;
low enough to avoid embrittlement effects.

Low Y content:

Sufficiently high to still form sufficient Y aluminate for the formation of Y-containing "pegs" with low oxygen contamination; low enough to negatively accelerate the oxide layer growth of the $Al_2O_3$ layer.

Tantalum has a positive effect on the phase stability of the γ' phase or shifts the transition to higher temperatures and thus slows down the phase degradation by the consumption of aluminum in the layer.

It is to be noted that the proportions of the individual elements are specially adapted with a view to their effects, which are to be seen particularly in connection with the element silicon. If the proportions are dimensioned so that no silicon precipitates are formed, then advantageously no brittle phases are created during use of the protective layer so that the operating time performance is improved and extended.

This is achieved not only by a low chromium content but also, taking into account the effect of aluminum on the phase formation, by accurately dimensioning the aluminum content.

In conjunction with the reduction of the brittle phases, which have a detrimental effect particularly with high mechanical properties, the reduction of the mechanical stresses due to the selected nickel content improves the mechanical properties.

With good corrosion resistance, the protective layer has particularly good resistance against oxidation and is also distinguished by particularly good ductility properties, so that it is particularly qualified for use in a gas turbine 100 (FIG. 3) with a further increase in the intake temperature. During operation, embrittlement scarcely takes place since the layer comprises hardly any chromium-silicon precipitates, which become embrittled in the course of use.

The powders are for example applied by plasma spraying (APS, LPPS, VPS, etc.) in order to form a protective layer. Other methods may likewise be envisaged (PVD, CVD, SPPS, etc.).

The described protective layer 7 also acts as a layer which improves adhesion to the superalloy.

Further layers, in particular ceramic thermal barrier layers 10, may be applied onto this protective layer 7.

In a component 1, the protective layer 7 is advantageously applied onto a substrate 4 made of a nickel-based or cobalt-based superalloy (FIG. 2).

Compositions of this type are known as casting alloys under the references GDT222, IN939, IN6203 and Udimet 500.

Other alternatives for the substrate 4 (FIG. 2) of the component 1, 120, 130, 155 are listed in FIG. 2.

The thickness of the protective layer 7 on the component 1 is preferably dimensioned with a value of between about 100 μm and 300 μm.

The protective layer 7 is particularly suitable for protecting the component 1, 120, 130, 155 against corrosion and oxidation while the component is being exposed to an exhaust gas at a material temperature of about 950° C., or even about 1100° C. in aircraft turbines.

The protective layer 7 according to the invention is therefore particularly qualified for protecting a component of a gas turbine 100, in particular a guide vane 120, rotor blade 130 or a heat shield element 155, which is exposed to hot gas before or in the turbine of the gas turbine 100 or of the steam turbine.

The protective layer 7 may be used as an overlay (the protective layer is the outermost layer) or as a bondcoat (the protective layer is an interlayer).

FIG. 1 shows a layer system 1 as a component.

The layer system 1 has a substrate 4.

The substrate 4 may be metallic and/or ceramic. Particularly in the case of turbine components, for example turbine rotor blades 120 (FIG. 4) or guide vanes 130 (FIGS. 3, 4), heat shield elements 155 (FIG. 5) or other housing parts of a steam or gas turbine 100 (FIG. 3), the substrate 4 has a nickel-, cobalt- or iron-based superalloy, in particular it consists thereof. Nickel-based superalloys (FIG. 2) are preferably used.

The protective layer 7 according to the invention is provided on the substrate 4.

This protective layer 7 is preferably applied by plasma spraying (VPS, LPPS, APS, etc.).

It may be used as an outer layer (not shown) or interlayer (FIG. 1).

Preferably, there will be a ceramic thermal barrier layer 10 on the protective layer 7.

Preferably, the layer system consists of substrate 4, protective layer 7 and ceramic thermal barrier layer 10, optionally of a TGO beneath the thermal barrier layer 10.

The protective layer 7 may be applied onto newly produced components and refurbished components.

Refurbishment means that components 1 are separated if need be from layers (thermal barrier layer) after their use and corrosion and oxidation products are removed, for example by an acid treatment (acid stripping). It may sometimes also be necessary to repair cracks. Such a component may subsequently be recoated, since the substrate 4 is very expensive.

Figure 3:
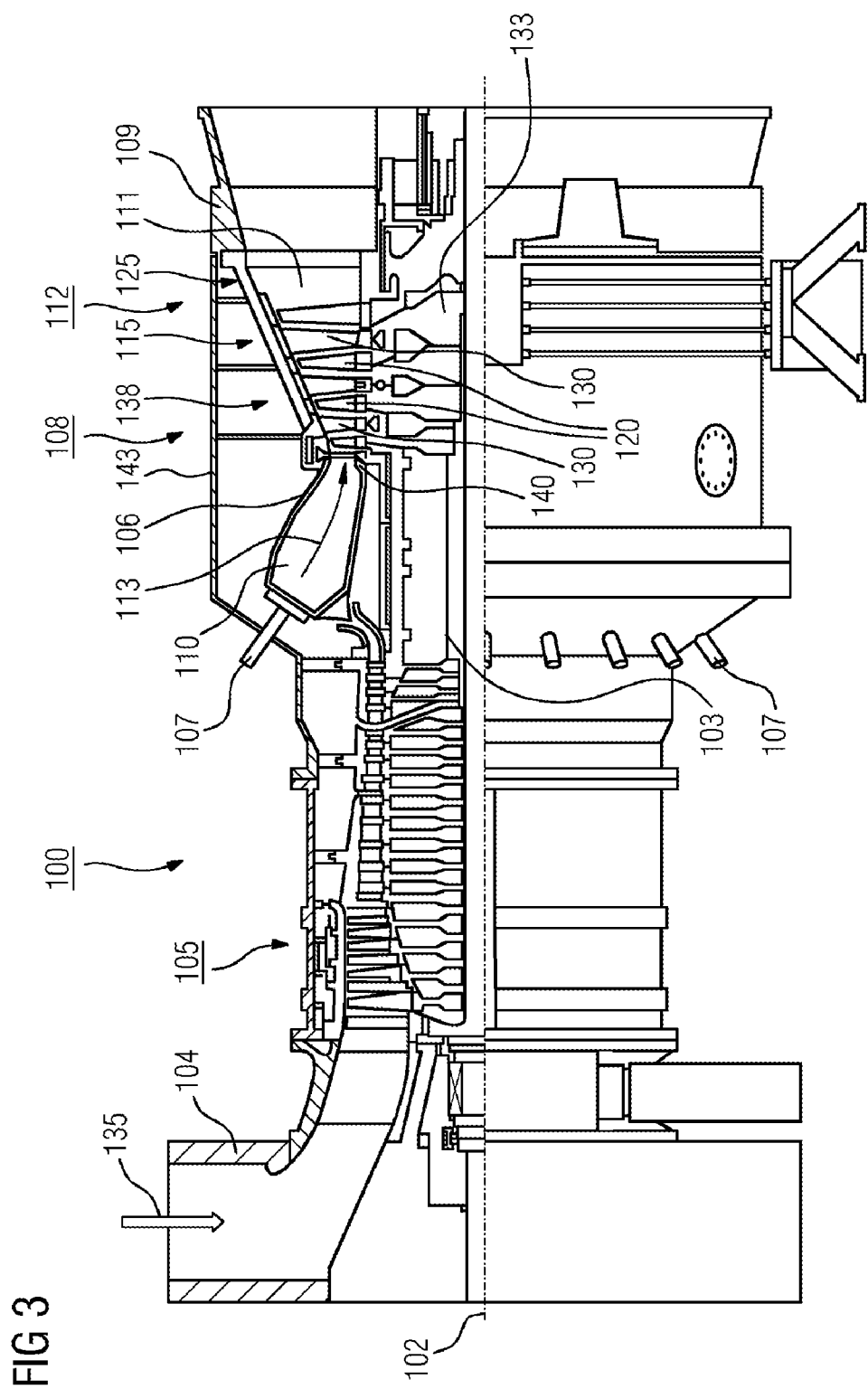
FIG. 3 shows a gas turbine.

FIG. 3 shows a gas turbine 100 by way of example in a partial longitudinal section.

The gas turbine 100 internally comprises a rotor 103, which will also be referred to as the turbine rotor, mounted so as to rotate about a rotation axis 102 and having a shaft 101.

Successively along the rotor 103, there are an intake manifold 104, a compressor 105, an e.g. toroidal combustion chamber 110, in particular a ring combustion chamber, having a plurality of burners 107 arranged coaxially, a turbine 108 and the exhaust manifold 109.

The ring combustion chamber 110 communicates with an e.g. annular hot gas channel 111. There, for example, four successively connected turbine stages 112 form the turbine 108. Each turbine stage 112 is formed for example by two blade rings. As seen in the flow direction of a working medium 113, a guide vane row 115 is followed in the hot gas channel 111 by a row 125 formed by rotor blades 120.

The guide vanes 130 are fastened on an inner housing 138 of a stator 143 while the rotor blades 120 of a row 125 are fitted on the rotor 103, for example by means of a turbine disk 133. Coupled to the rotor 103, there is a generator or a work engine (not shown).

During operation of the gas turbine 100, air 135 is taken in and compressed by the compressor 105 through the intake manifold 104. The compressed air provided at the turbine-side end of the compressor 105 is delivered to the burners 107 and mixed there with a fuel. The mixture is then burnt to form the working medium 113 in the combustion chamber 110. From there, the working medium 113 flows along the hot gas channel 111 past the guide vanes 130 and the rotor blades 120. At the rotor blades 120, the working medium 113 expands by imparting momentum, so that the rotor blades 120 drive the rotor 103 and the work engine coupled to it.

The components exposed to the hot working medium 113 experience thermal loads during operation of the gas turbine 100.

Apart from the heat shield elements lining the ring combustion chamber 110, the guide vanes 130 and rotor blades 120 of the first turbine stage 112, as seen in the flow direction of the working medium 113, are heated the most.

In order to withstand the temperatures prevailing there, they may be cooled by means of a coolant.

The substrates may likewise comprise a directional structure, i.e. they are single-crystal (SX structure) or comprise only longitudinally directed grains (DS structure).

Iron-, nickel- or cobalt-based superalloys are for example used as the material for the components, in particular for the turbine blades 120, 130 and components of the combustion chamber 110.

Such superalloys are known for example from EP 1 204 776 B1, EP 1 306 454, EP 1 319 729 A1, WO 99/67435 or WO 00/44949.

The guide vanes 130 comprise a guide vane root (not shown here) facing the inner housing 138 of the turbine 108, and a guide vane head lying opposite the guide vane root. The guide vane head faces the rotor 103 and is fixed on a fastening ring 140 of the stator 143.

Figure 4:
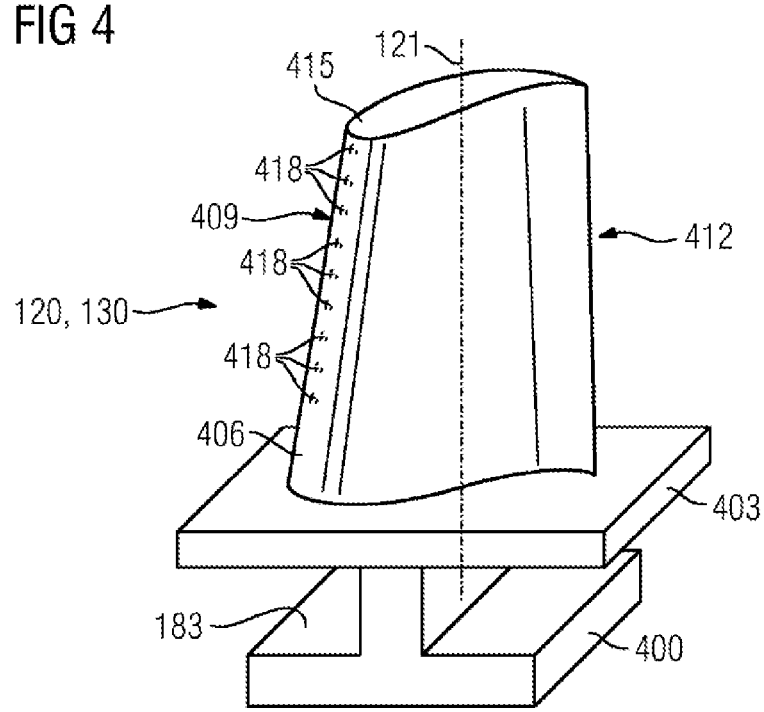
FIG. 4 shows a turbine blade and
FIG. 5 shows a combustion chamber.

FIG. 4 shows a perspective view of a rotor blade 120 or guide vane 130 of a turbomachine, which extends along a longitudinal axis 121.

The turbomachine may be a gas turbine of an aircraft or of a power plant for electricity generation, a steam turbine or a compressor.

The blade 120, 130 comprises, successively along the longitudinal axis 121, a fastening zone 400, a blade platform 403 adjacent thereto as well as a blade surface 406 and a blade tip 415.

As a guide vane 130, the vane 130 may have a further platform (not shown) at its vane tip 415.

A blade root 183 which is used to fasten the rotor blades 120, 130 on a shaft or a disk (not shown) is formed in the fastening zone 400.

The blade root 183 is configured, for example, as a hammerhead. Other configurations as a firtree or dovetail root are possible.

The blade 120, 130 comprises a leading edge 409 and a trailing edge 412 for a medium which flows past the blade surface 406.

In conventional blades 120, 130, for example solid metallic materials, in particular superalloys, are used in all regions 400, 403, 406 of the blade 120, 130.

Such superalloys are known for example from EP 1 204 776 B1, EP 1 306 454, EP 1 319 729 A1, WO 99/67435 or WO 00/44949.

The blade 120, 130 may in this case be manufactured by a casting method, also by means of directional solidification, by a forging method, by a machining method or combinations thereof.

Workpieces with a single-crystal structure or single-crystal structures are used as components for machines which are exposed to heavy mechanical, thermal and/or chemical loads during operation.

Such single-crystal workpieces are manufactured, for example, by directional solidification from the melts. These are casting methods in which the liquid metal alloy is solidified to form a single-crystal structure, i.e. to form the single-crystal workpiece, or is directionally solidified.

Dendritic crystals are in this case aligned along the heat flux and form either a rod crystalline grain structure (columnar, i.e. grains which extend over the entire length of the workpiece and in this case, according to general terminology usage, are referred to as directionally solidified) or a single-crystal structure, i.e. the entire workpiece consists of a single crystal. It is necessary to avoid the transition to globulitic (polycrystalline) solidification in these methods, since non-directional growth will necessarily form transverse and longitudinal grain boundaries which negate the beneficial properties of the directionally solidified or single-crystal component.

When directionally solidified structures are referred to in general, this is intended to mean both single crystals which have no grain boundaries or at most small-angle grain boundaries, and also rod crystal structures which, although they do have grain boundaries extending in the longitudinal direction, do not have any transverse grain boundaries. These latter crystalline structures are also referred to as directionally solidified structures.

Such methods are known from U.S. Pat. No. 6,024,792 and EP 0 892 090 A1.

The blades 120, 130 may also have layers 7 according to the invention protecting against corrosion or oxidation.

The density is preferably 95% of the theoretical density.

A protective aluminum oxide layer (TGO=thermally grown oxide layer) is formed on the MCrAlX layer (as an interlayer or as the outermost layer).

On the MCrAlX, there may furthermore be a thermal barrier layer, which is preferably the outermost layer and consists for example of $ZrO_2$, $Y_2O_3$—$ZrO_2$, i.e. it is not stabilized or is partially or fully stabilized by yttrium oxide and/or calcium oxide and/or magnesium oxide.

The thermal barrier layer covers the entire MCrAlX layer.

Rod-shaped grains are produced in the thermal barrier layer by suitable coating methods, for example electron beam deposition (EB-PVD).

Other coating methods may be envisaged, for example atmospheric plasma spraying (APS), LPPS, VPS or CVD. The thermal barrier layer may comprise porous, micro- or macro-cracked grains for better thermal shock resistance. The thermal barrier layer is thus preferably more porous than the MCrAlX layer.

The blade 120, 130 may be designed to be hollow or solid. If the blade 120, 130 is intended to be cooled, it will be hollow and optionally also comprise film cooling holes 418 (indicated by dashes).

Figure 5:
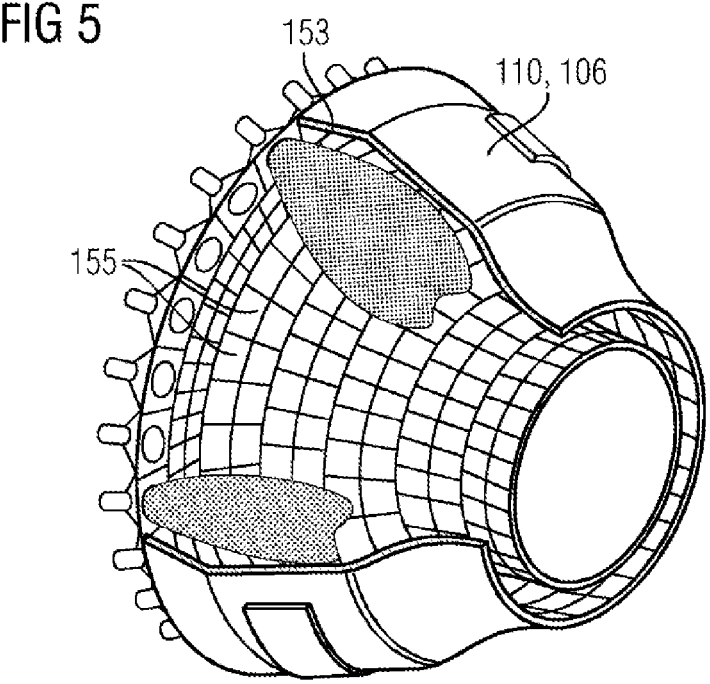

FIG. 5 shows a combustion chamber 110 of the gas turbine 100. The combustion chamber 110 is designed for example as a so-called ring combustion chamber in which a multiplicity of burners 107, which produce flames 156 and are arranged in the circumferential direction around a rotation axis 102, open into a common combustion chamber space 154. To this end, the combustion chamber 110 as a whole is designed as an annular structure which is positioned around the rotation axis 102.

In order to achieve a comparatively high efficiency, the combustion chamber 110 is designed for a relatively high temperature of the working medium M, of about 1000° C. to 1600° C. In order to permit a comparatively long operating time even under these operating parameters which are unfavorable for the materials, the combustion chamber wall 153 is provided with an inner lining formed by heat shield elements 155 on its side facing the working medium M.

Owing to the high temperatures inside the combustion chamber 110, a cooling system may also be provided for the heat shield elements 155 or for their retaining elements. The heat shield elements 155 are then hollow, for example, and optionally also have cooling holes (not shown) opening into the combustion chamber space 154.

Each heat shield element 155 made of an alloy is equipped with a particularly heat-resistant protective layer (MCrAlX layer and/or ceramic coating) on the working medium side, or is made of refractory material (solid ceramic blocks).

These protective layers 7 may be similar to the turbine blades. On the MCrAlX, there may furthermore be an e.g. ceramic thermal barrier layer which consists for example of $ZrO_2$, $Y_2O_3$—$ZrO_2$, i.e. it is not stabilized or is partially or fully stabilized by yttrium oxide and/or calcium oxide and/or magnesium oxide.

Rod-shaped grains are produced in the thermal barrier layer by suitable coating methods, for example electron beam deposition (EB-PVD).

Other coating methods may be envisaged, for example atmospheric plasma spraying (APS), LPPS, VPS or CVD. The thermal barrier layer may comprise porous, micro- or macro-cracked grains for better thermal shock resistance.

Refurbishment means that turbine blades 120, 130 or heat shield elements 155 may need to be stripped of protective layers (for example by sandblasting) after their use. The corrosion and/or oxidation layers or products are then removed. Optionally, cracks in the turbine blade 120, 130 or heat shield element 155 are also repaired. The turbine blades 120, 130 or heat shield elements 155 are then recoated and the turbine blades 120, 130 or heat shield elements 155 are used again.

The invention claimed is:

1. A component, of a gas turbine, including
    a substrate of the component which is nickel-based or cobalt-based;
    a plasma-sprayed protective layer consisting of an alloy, the alloy consists of alloying elements, the alloying elements of the alloy consist of
    22% to 24% wt. % cobalt (Co),
    14% to 16% wt. % chromium (Cr),
    10.5% to 11.5% wt. % aluminum (Al),
    0.2% to 0.4% wt. % yttrium (Y),
    0.3% to 0.9% wt. % tantalum (Ta),
    and balance of the alloy is nickel (Ni),
    the protective layer residing over the substrate in order to protect against corrosion and oxidation at high temperatures; and
    a ceramic thermal barrier layer applied onto the protective layer,
    wherein proportions of the alloying elements of the alloy of the protective layer are selected to avoid forming brittle phases at 950° C. or higher, and to protect the substrate against corrosion and oxidation while the protective layer is exposed to exhaust gases at 950° C. or higher, wherein the brittle phases include alpha phase of Co, alpha phase of Cr, and sigma phase of Cr; and wherein the alloy protects the substrate against corrosion and oxidation at 950° C. or higher, and is ductile enough to be able to accommodate possible deformations of the substrate and not crack to avoid providing points of attack for oxidation and corrosion at 950° C. or higher.

2. The component as claimed in claim 1, wherein the alloy includes 0.3 wt. % yttrium (Y).

3. The component as claimed in claim 1, wherein the alloy contains at least 0.4 wt. % tantalum (Ta).

4. The component as claimed in claim 1, wherein nickel (Ni) forms a matrix of the alloy.

5. The component as claimed in claim 1, wherein the plasma spraying comprises APS or high velocity spraying (HVOF).

6. The component as claimed in claim 1, wherein the alloy includes 23 wt. % Co.

7. The component as claimed in claim 1, wherein the ceramic thermal barrier layer consists of partially or fully stabilized $ZrO2$.

8. The component as claimed in claim 1, wherein the protective layer does not include silicon precipitates.

* * * * *